United States Patent [19]

Wilson

[11] Patent Number: 5,583,583
[45] Date of Patent: Dec. 10, 1996

[54] METAL FRAME SUNGLASSES AND METHOD OF MAKING THE SAME

[76] Inventor: Ken Wilson, 5384 Linda Vista Rd., #104, San Diego, Calif. 92110

[21] Appl. No.: 564,489
[22] Filed: Nov. 29, 1995
[51] Int. Cl.⁶ .............................. G02C 1/08; G02C 5/14
[52] U.S. Cl. ................ 351/41; 351/90; 351/122
[58] Field of Search .................... 351/121, 122, 351/123, 111, 41, 158, 90, 92

[56] References Cited

U.S. PATENT DOCUMENTS 2,561,402  7/1951  Nelson ..................................... 351/123
3,953,114  4/1976  Bidgood .................................. 351/123

*Primary Examiner*—Hung Dang
*Attorney, Agent, or Firm*—Charles C. Logan, II

[57] ABSTRACT

A pair of sunglasses having an elongated sunglasses frame that is entirely formed from a single sheet of flat aluminum or titanium stock that is bent into a predetermined shape. Left and right hinge mounting portions are formed adjacent the respective edges of the sunglasses frame. A left lens aperture is formed in the sunglasses frame between the left hinge mounting portion and the bridge portion. A right lens aperture is formed in the sunglasses frame between the right hinge mounting portion and the bridge portion. The dimensions of the respective apertures have a greater height and a greater width on the front surface of the sunglasses frame so that lenses pressed into the respective apertures through their front surface edge won't pass out its rear surface edge. A groove is formed in the periphery of each of the apertures and they mate with a ridge formed on the periphery of the respective left and right sunglasses lenses. The metal material of the sunglasses frame permits sufficient stretching or elongation of the material around the lens apertures to allow the sunglass lenses to snap into the grooves around the perimeter of the lens apertures.

17 Claims, 2 Drawing Sheets

METAL FRAME SUNGLASSES AND METHOD OF MAKING THE SAME

BACKGROUND OF THE INVENTION

The invention relates to sunglasses and more specifically to sunglasses having a frame punched out of a flat sheet of metal and then has left and right lens apertures machined therein.

Presently, most metal glasses frames are made of nickel and other strong metals. The metal structure of these frames have thin extruded sections that are bent into desired shapes and the frame structure surrounding the lens apertures do not form a closed loop into which the lens is inserted. Instead, the structure surrounding the lens apertures are split. This allows the lens aperture to be opened wider for inserting the lens. Then the open portions of the split frame are drawn together and a tightened screw holds the two portions of the frame loop together around the lens. This is known as a screw mounting lens system.

In the past one manufacturer made cast aluminum sunglasses frames, but the frames had to be slit in order to get the lens in and out. A screw had to be used to pull the two open ends of the frame together around the lens that had been inserted into the frame.

Plastic eyeglasses and sunglasses frames use what is called tension mounting, meaning the lens is held without screws and is kept in place by tension. The eyeglasses and sunglasses industry has consistently been of the opinion that metal sunglasses frames cannot be made that would use only tension mounting for holding the lenses in the sunglasses frame.

Prior art, metal eyeglasses and Sunglasses frames could not be adapted for tension mounting lenses therein. Their thin metal frames bend too easily and have their shape distorted.

It is an object of the invention to provide a novel metal sunglasses frame that allows lenses to be tension mounted in machined apertures in the metal frame.

It is also an object of the invention to provide a novel aluminum or titanium sunglasses frame that has been manufactured from a sheet of flat material.

It is another of the invention to provide a novel sunglasses frame made of aluminum or titanium that is economical to manufacture and market.

It is an additional object of the invention to provide a novel pair of sunglasses having temple members with unique rubber ear pads mounted on their inner surfaces that eliminates the tendency of the sunglasses to slip or move around while participates in active sports.

It is a further object of the invention to provide a novel pair of sunglasses that is made of aluminum or titanium that has a tendency to absorb heat but not retain it and thereby prevent the lenses from fogging when worn during active sporting events.

SUMMARY OF THE INVENTION

The novel sunglasses frame has been produced from flat sheet stock of aluminum or titanium material. Initially a blank is punched from the sheet material. The blank of the sunglasses frame is then set up for milling the left and right sunglasses lens apertures. Also grooves are milled around the perimeter of the lens aperture for receiving the perimeter ridge on the lenses. Recesses are formed in the rear wall of the blank for receiving the hinges. Holes for the hinges and the nose piece are then drilled in the blank. Counterbores are formed in the front surface of the blank opposite its hinge mounting holes. The blank at this juncture is heat treated in an annealing process to allow the frame to have compound bends formed adjacent the hinge mounting portions and also form the spherical radius for each lens aperture. Finally the sunglass frame is heat treated to harden the material of the frame. The assembly process follows and at that time hinges are riveted to the frame and the left and right temple members. The left and right sunglasses lens are then tension mounted in the frame.

If the sunglasses frame is going to have the sunglass lenses installed using the screw mounting system, a horizontal cut is made from the respective left and right edges of the frame at its hinge mounting portions through until it intersects the perimeter of the lens apertures. The respective left and right sunglass lenses can then be inserted into their respective apertures and the top and bottom halves of the hinge mounting portions can be secured together by tightening the upper and lower hinge members whose opposite ends are secured to the front end of the temple members.

The temple members are also made from flat sheet stock material such as aluminum or titanium. The temple members are punched out of a blank sheet of metal and elongated recesses are milled on their inner surfaces and extend to a point adjacent their rear ends. Resilient ear pads are glued in the recesses and they extend only a short height above the surface surrounding the recesses. The ear pads have been designed to conceal their installation on the temple members. This keeps them from detracting from the style and aesthetics of the temple members. The ear pads allow the sunglasses to stay on the users head without slipping while participating in sports such as mountain biking, snow skiing, snow boarding, hiking, running and other outdoor sports. The silicone rubber used is hydrophilic, which absorbs sweat and creates a sticky feeling to help the glasses stay snug when a person perspires.

The use of solid sheets of aluminum or titanium metal for the sunglass frames creates a massive heat sink for conducting heat away from the wearer's head. Aluminum and titanium, unlike other metals, has a tendency to absorb heat but not to retain it. Sunglasses that wrap close to the wearer's head will create fogging problems if used during a strenuous activity. The mass of material of the sunglasses frame conducts heat and takes it away from the lens therefore allowing the lens not to fog in extreme conditions. Ventilation of the area surrounding the lens is not a critical problem when using the novel titanium or aluminum sunglass frames.

An added advantage of the novel aluminum or titanium sunglasses frame is that when left in the sun on the dashboard or seat of a vehicle, they do get hot, but they cool quickly.

DESCRIPTION OF THE PREFERRED EMBODIMENT

Figures 1, 2, 3, 4:
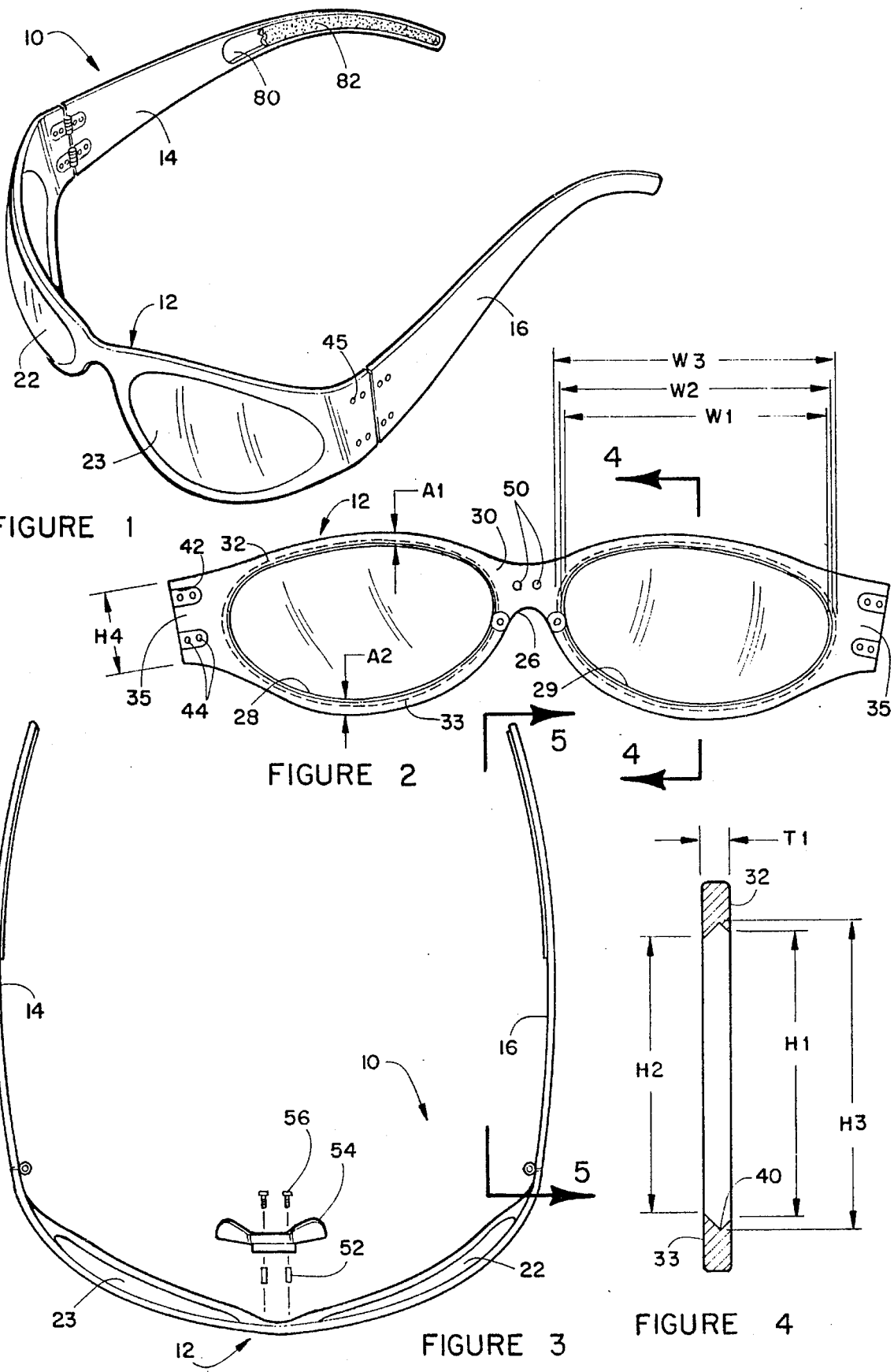
FIG. 1 is a front perspective view of the novel sunglasses.
FIG. 2 is a rear elevation view of the sunglass frame.
FIG. 3 is a top plan view of the novel sunglasses.
FIG. 4 is an enlarged cross sectional view taken along lines 4—4 of FIG. 2.
Figure 5:
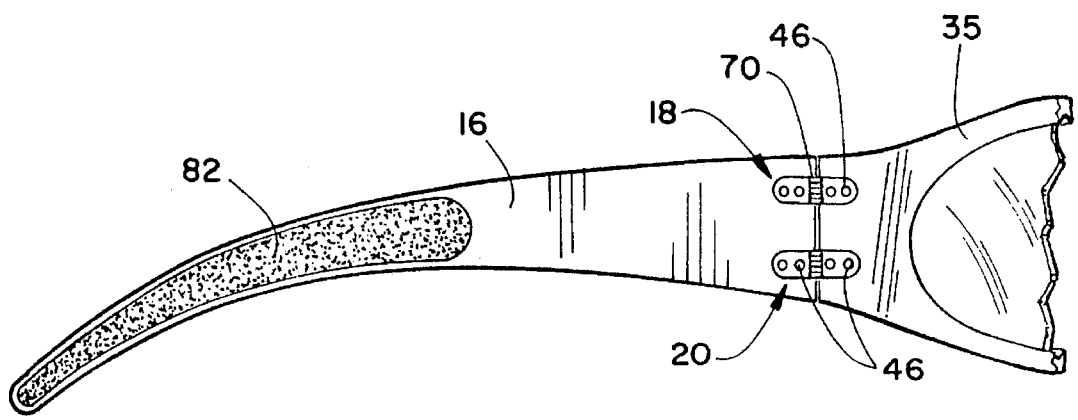
FIG. 5 is a side elevation view showing the upper and lower hinge assemblies connecting the sunglasses frame to a temple member.

The novel sunglasses will now be described by referring to FIGS. 1–7 of the drawings. The sunglasses are generally designated numeral 10.

Sunglasses 10 have a sunglasses frame 12, a left temple member 14 and a right temple member 16. Upper hinge assemblies 18 and lower hinge assemblies 20 secure the front ends of the temple members to the lens frame 12. Almond shaped sunglasses lenses 22 and 23 are tension mounted in lens frame 12.

Sunglasses frame 12 will be specifically described by referring to FIG. 2. The bottom edge of lens frame 12 has a nose recess 26 formed between left lens aperture 28 and right sunglass lens aperture 29. A bridge portion 30 is formed above nose recess 26.

Each sunglass lens aperture in the sunglasses frame has a top rim member 32 and a bottom rim member 33. A hinge mounting portion 35 is located adjacent each of the respective ends of sunglass frame 12. It is critical that the sunglasses frame have a predetermined amount of mass of metal material around the lens apertures. If the rim members 32 and 33 don't have a sufficient height, these members will distort and fracture when the lenses are forced into the lens apertures. Likewise if the height of the rim members are too great, they will be unable to stretch a sufficient amount to allow the lens to snap into the lens apertures. Top rim member 32 and bottom rim member 33 have a height A1 that is in the range of 0.050–0.200. Each of the sunglasses lens apertures 28 and 29 have a front surface aperture that is greater than the rear surface aperture. The front surface aperture 37 has a height H1 and a width W1. H1 is in the range of 1.000–2.000. W1 is in the range of 2.000–3.000 inches. The rear surface aperture 39 has a height H2 and a width W2. Its dimensions are smaller than that of the front surface aperture so that a lens inserted from its front surface will not pass through and out the rear of the aperture. A V-shaped groove 40 is formed in the interior of the respective lens apertures and they have a height H3 and a width W3. The left and right hinge mounting portions 35 have a height H4 that is in the range of 0.300–0.900 inches. Recesses 42 are formed in the rear surface of lens frame 12 for receiving the hinge assemblies. Apertures 44 pass entirely through the thickness of lens frame 12 and have countersunk recesses 45 to receive one end of the rivets 46 that are inserted therethrough.

Recesses 50 are drilled into the rear surface of bridge 30. Internally threaded bushings 52 have their one end forced therein and a noseguard 54 is secured thereto by screws 56.

Figure 6:
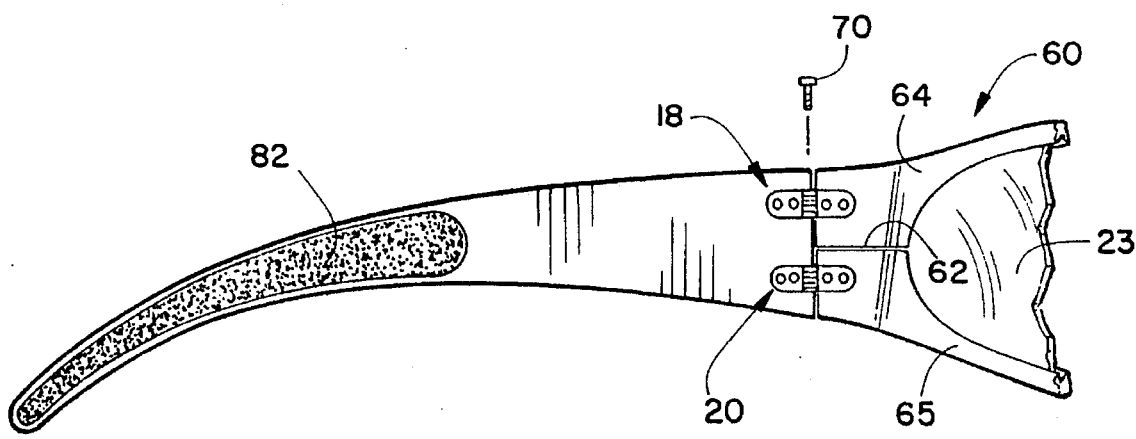
FIG. 6 is a partial side elevation view of the temple member and the inside surface of an alternative sunglasses frame.

An alternative embodiment of the lens frame is illustrated in FIG. 6 and it is designated numeral 60. It has a horizontal slit 62 that divides the hinge mounting portion into an upper portion 64 and a lower portion 65. Conventional screws 70 in upper hinge assembly 18 and lower hinge assembly 20 keep the sunglass lens 23 secured in its aperture.

Figure 7:
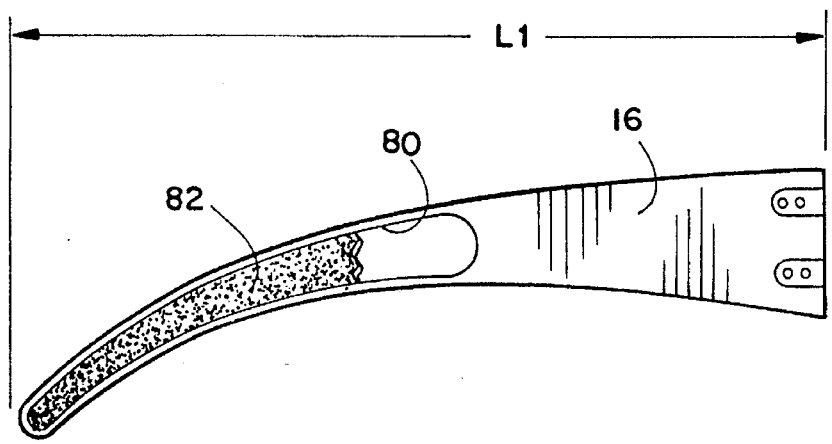
FIG. 7 is a side elevation view of the inner surface of a novel temple member.

The inner surface of temple member 14 is illustrated in FIG. 7. Temple member 14 and temple member 15 have a length L1. An elongated recess 80 extends from a point adjacent the rear end of temple member 14 along a substantial portion of its length. A pad 82 of resilient material such as rubber is glued in recess 80 and it has a thickness only slightly greater than the depth of recess 80 to provide a gripping surface against the side of the head of the person wearing the sunglasses.

What is claimed is:

1. A pair of sunglasses comprising:

an elongated sunglasses frame having a front surface, a rear surface, a top edge, a bottom edge, a left edge and a right edge; said sunglasses frame being entirely formed from a single sheet of flat aluminum stock that is bent into a predetermined shape; the bottom edge of said sunglasses frame having a centrally formed nose recess; the structure between said top edge and said nose recess is a bridge portion; a left hinge mounting portion is formed adjacent said left edge and a right hinge mounting portion is formed adjacent said right edge;

a left lens aperture in said sunglasses frame between said left hinge mounting portion and said bridge portion and it forms a top rim member and a bottom rim member each having respective heights A1 and A2 and A1 and A2 are both in the range of 0.050–200 inches;

a right lens aperture in said sunglasses frame between said right hinge mounting portion and said bridge portion and it forms a top rim member and a bottom rim member each having respective heights A1 and A2 and A1 and A2 are both is in the range of 0.050–0.200 inches;

said left lens aperture having a predetermined configuration in said sunglasses frame and it has a front surface edge and a rear surface edge; the maximum height and width of said lens aperture at its front surface edge is H1 and W1; the maximum height and width of said lens aperture at its rear surface edge is H2 and W2; H1 is greater than H2 and W1 is greater than W2 so that a lens pressed into said left lens aperture through its front surface edge won't pass out its rear surface edge; a groove is formed in said sunglasses frame in the periphery of said left lens aperture and said groove has a bottom surface; the maximum height of the bottom surface of said groove of said lens aperture is H3 and the maximum width of the bottom surface of said lens aperture is W3 and H3 is greater than H1 and W3 is greater than W1;

said right lens aperture having a predetermined configuration in said sunglasses frame and it has a front surface edge and a rear surface edge; the maximum height and width of said lens aperture at its front surface edge is H1 and W1; the maximum height and width of said lens aperture at its rear surface edge is H2 and W2; H1 is greater than H2 and W1 is greater than W2 so that a lens pressed into said right aperture through its front surface edge won't pass out its rear surface edge; a groove is formed in said sunglasses frame in the periphery of said right lens aperture and said groove has a bottom surface; the maximum height of the bottom surface of said groove of said lens aperture is H3 and the maximum width of the bottom surface of said lens aperture is W3 and H3 is greater than H1 and W3 is greater than W1;

a left sunglass lens and a right sunglass lens and each has a ridge that extends around its periphery and said ridge is of a configuration to mate with the respective grooves in said respective left and right lens apertures; said left and right sunglass lens each having a height greater than H1 and a width greater than W1; said left and right sunglass lens being mounted in their respective left and right lens apertures by pressing them into the front of their respective lens apertures until their top and bottom rim members have stretched enough to allow said sunglasses lenses to snap into the grooves around the perimeter of said lens apertures;

a left temple member having a front end and hinge means connecting said front end to said left hinge mounting portion of said sunglasses frame; and a right temple member having a front end and hinge means connecting said front end to said right hinge mounting portion of said sunglasses frame.

2. A pair of sunglasses as recited in claim 1 wherein the rear surface of said sunglass frame has a concave curvature to conform to the face of a person who would wear the sunglasses.

3. A pair of sunglasses as recited in claim 1 wherein said sunglasses frame has a thickness T1 in the range of 0.050–0.200 inches.

4. A pair of sunglasses as recited in claim 1 wherein said left and right lens aperture have an almond shape.

5. A pair of sunglasses as recited in claim 1 wherein the right edge and left edge of said sunglass frame each have a height H4 in the range of 0.250–1.000 inches.

6. A pair of sunglasses as recited in claim 1 wherein the rear surface of said left and right sunglass lens each have a concave curvature.

7. A pair of sunglasses as recited in claim 1 wherein H1 is in the range of 1.000–2.000 inches and W1 is in the range of 2.000–3.000 inches.

8. A pair of sunglasses as recited in claim 1 wherein the left and right hinge mounting portions of said sunglasses frame have been cut along a horizontal line from their rear edge to their respective lens aperture to form a top half and a bottom half that allows the respective top half and bottom half to be spread apart so that a sunglasses lens can be installed in the respective lens apertures.

9. A pair of sunglasses comprising:

an elongated sunglasses frame having a front surface, a rear surface, a top edge, a bottom edge, a left edge and a right edge; said sunglasses frame being entirely formed from a single sheet of flat titanium stock that is bent into a predetermined shape; the bottom edge of said sunglass frame having a centrally formed nose recess; the structure between said top edge and said nose recess is a bridge portion; a left hinge mounting portion is formed adjacent said left edge and a right hinge mounting portion is formed adjacent said right edge;

a left lens aperture in said sunglasses frame between said left hinge mounting portion and said bridge portion and it forms a top rim member and a bottom rim member each having respective heights A1 and A2 and A1 and A2 are both in the range of 0.050–0.200 inches;

a right lens aperture in said sunglasses frame between said right hinge mounting portion and said bridge portion and it forms a top rim member and a bottom rim member each having respective heights A1 and A2 and A1 and A2 are both in the range of 0.050–0.200 inches;

said left lens aperture having a predetermined configuration in said sunglasses frame and it has a front surface edge and a rear surface edge; the maximum height and width of said lens aperture at its front surface edge is H1 and W1; the maximum height and width of said lens aperture at its rear surface edge is H2 and W2; H1 is greater than H2 and W1 is greater than W2 so that a lens pressed into said left lens aperture through its front surface edge won't pass out its rear surface edge; a groove is formed in said sunglasses frame in the periphery of said left lens aperture and said groove has a bottom surface; the maximum height of the bottom surface of said groove of said lens aperture is H3 and the maximum width of the bottom surface of said lens aperture is W3 and H3 is greater than H1 and W3 is greater than W1;

said right lens aperture having a predetermined configuration in said sunglasses frame and it has a front surface edge and a rear surface edge; the maximum height and width of said lens aperture at its front surface edge is H1 and W1; the maximum height and width of said lens aperture at its rear surface edge is H2 and W2; H1 is greater than H2 and W1 is greater than W2 so that a lens pressed into said right aperture through its front surface edge won't pass out its rear surface edge; a groove is formed in said eyeglasses frame in the periphery of said right lens aperture and said groove has a bottom surface; a maximum height of the bottom surface of said groove of said lens aperture is H3 and the maximum width of the bottom surface of said lens aperture is W3 and H3 is greater than H1 and W3 is greater than W1;

a left sunglasses lens and a right sunglasses lens and each has a ridge that extends around its periphery and said ridge is of a configuration to mate with the respective grooves in said respective left and right lens apertures; said left and right sunglasses lens each having a height greater than H1 and a width greater than W1; said left and right sunglasses lens being mounted in their respective left and right lens apertures by pressing them into the front of their respective lens apertures until their top and bottom rim members have stretched enough to allow said sunglasses lenses to snap into the grooves around the perimeter of said lens apertures;

a left temple member having a front end and hinge means connecting said front end to said left hinge mounting portion of said sunglasses frame; and a right temple member having a front end and hinge means connecting said front end to said right hinge mounting portion of said sunglasses frame.

10. A pair of sunglasses as recited in claim 9 wherein the rear surface of said sunglass frame has a concave curvature to conform to the face of a person who would wear the sunglasses.

11. A pair of sunglasses as recited in claim 9 wherein said sunglasses frame has a thickness T1 in the range of 0.060–0.200 inches.

12. A pair of sunglasses as recited in claim 9 wherein said left and right lens aperture have an almond shape.

13. A pair of sunglasses as recited in claim 9 wherein the right edge and left edge of said sunglasses frame each have a height H4 in the range of 0.250–1.000 inches.

14. A pair of sunglasses as recited in claim 9 wherein the rear surface of said left and right sunglasses lens each have a concave curvature.

15. A pair of sunglasses as recited in claim 9 wherein H1 is in the range of 1.000–2.000 inches and W1 is in the range of 2.000–3.000 inches.

16. A pair of sunglasses as recited in claim 9 wherein the left and right hinge mounting portions of said sunglasses frame have been cut along a horizontal line from their rear edge to their respective lens aperture to form a top half and a bottom half that allows the respective top half and bottom half to be spread apart so that a sunglasses lens can be installed in the respective lens apertures.

17. A method of making a pair of sunglasses comprising the following steps:

a) taking of sheet of metal having a thickness T1 in the range of 0.050–0.150 inches and punch a blank out of it having the outer peripheral shape of a sunglasses frame;

b) milling left and right sunglasses lens apertures in said blank;

c) milling grooves around the perimeter of said lens apertures for receiving the perimeter ridge on the lenses;

d) subjecting said sunglasses frame to a heat treatment process for annealing the metal of said frame to reduce its brittleness;

e) bending said sunglasses frame at its hinge mounting portions and also bending spherical radius for said lens apertures;

f) subjecting said sunglasses frame to a heat treatment process to harden the metal material of said frame.

* * * * *